United States Patent
Zhang et al.

(10) Patent No.: US 7,824,802 B2
(45) Date of Patent: Nov. 2, 2010

(54) METHOD OF PREPARING A COMPOSITE CATHODE ACTIVE MATERIAL FOR RECHARGEABLE ELECTROCHEMICAL CELL

(75) Inventors: Shengshui Zhang, Olney, MD (US); Kang Xu, North Potomac, MD (US); T. Richard Jow, Potomac, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 205 days.

(21) Appl. No.: 11/623,777

(22) Filed: Jan. 17, 2007

(65) Prior Publication Data

US 2008/0168865 A1 Jul. 17, 2008

(51) Int. Cl.
*H01M 4/58* (2010.01)
*H01M 4/60* (2010.01)
*C01B 15/16* (2006.01)

(52) U.S. Cl. .................. 429/218.1; 429/215; 423/306
(58) Field of Classification Search ............. None
See application file for complete search history.

(56) References Cited

U.S. PATENT DOCUMENTS

| | | | |
|---|---|---|---|
| 5,910,382 A | 6/1999 | Goodenough et al. | |
| 6,383,235 B1 * | 5/2002 | Maegawa et al. | 29/623.5 |
| 6,391,493 B1 | 5/2002 | Goodenough et al. | |
| 6,514,640 B1 | 2/2003 | Armand et al. | |
| 6,528,033 B1 * | 3/2003 | Barker et al. | 423/306 |
| 6,632,566 B1 | 10/2003 | Yamada et al. | |
| 6,720,112 B2 | 4/2004 | Barker et al. | |
| 6,730,281 B2 | 5/2004 | Barker et al. | |
| 6,855,273 B2 | 2/2005 | Ravet et al. | |
| 6,884,544 B2 | 4/2005 | Barker et al. | |
| 6,962,666 B2 | 11/2005 | Ravet et al. | |
| 7,025,907 B2 | 4/2006 | Kohzaki et al. | |
| 7,060,206 B2 | 6/2006 | Barker et al. | |
| 2006/0035150 A1 * | 2/2006 | Audemer et al. | 429/221 |

FOREIGN PATENT DOCUMENTS

CN 1529368 A * 9/2004
WO WO 2004/001881 A2 12/2003

OTHER PUBLICATIONS

Guo et al., "Fine-Particle Carbon-enriches Li0.98Mg0.02FePO4 Synthesized by A Novel Modified Solid-State Reaction", Synthetic Metals 153 (2005) 113-116.*

(Continued)

*Primary Examiner*—Dah-Wei D Yuan
*Assistant Examiner*—Edu E Enin-Okut
(74) *Attorney, Agent, or Firm*—Avrom David Spevack

(57) ABSTRACT

A method of preparing a composite cathode active material having superior cell characteristics includes mixing and milling starting material, carbon and an organic complexing agent. The mixture is heated at a first temperature in an inert atmosphere to form a composite precursor, and then the precursor is ground and heated at a second temperature in an inert atmosphere to produce a carbon-containing composite cathode material having high electronic conductivity. The said composite cathode has a general formula of $LiFe_{1-x}M_xPO_4$—C, within $0 \leq x < 1$, M is selected from the group consisting of Co, Ni, V, Cr, Mn and a mixture thereof.

14 Claims, 4 Drawing Sheets

OTHER PUBLICATIONS

Zhang et al., "Optimization of reaction condition for solid-state synthesis of LiFePO4-C composite cathodes", Journal of Power Sources 147 (2005) 234-240.*

Penazzi et al., "Mixed lithium phosphates as cathode materials for Li-Ion cells", Journal of the European Ceramic Society 24 (2004) 1381-1384.*

* cited by examiner

*Fig.* 3
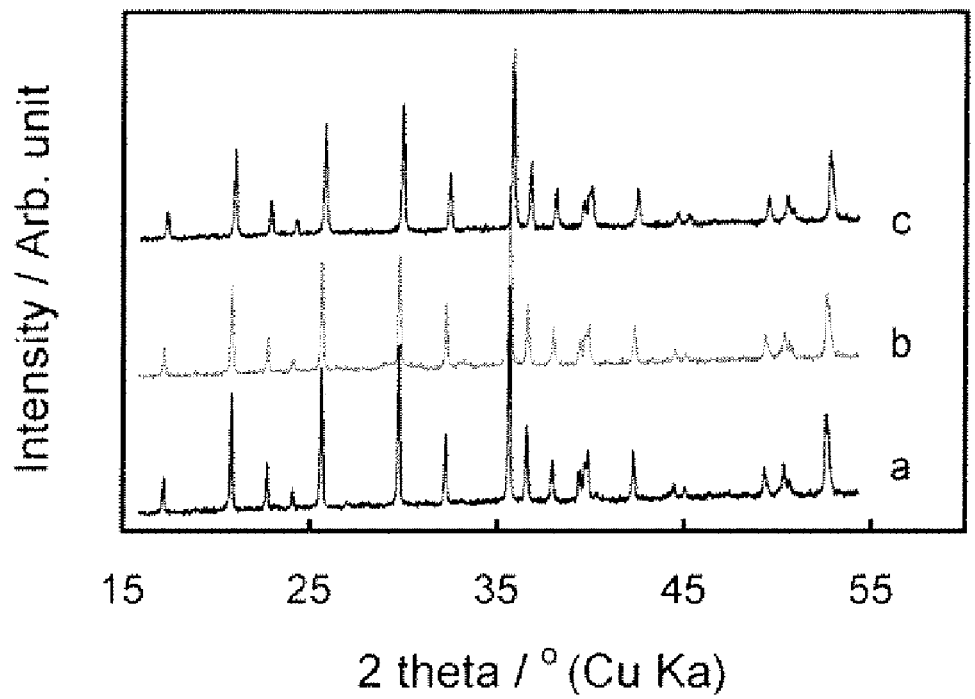
Fig. 4
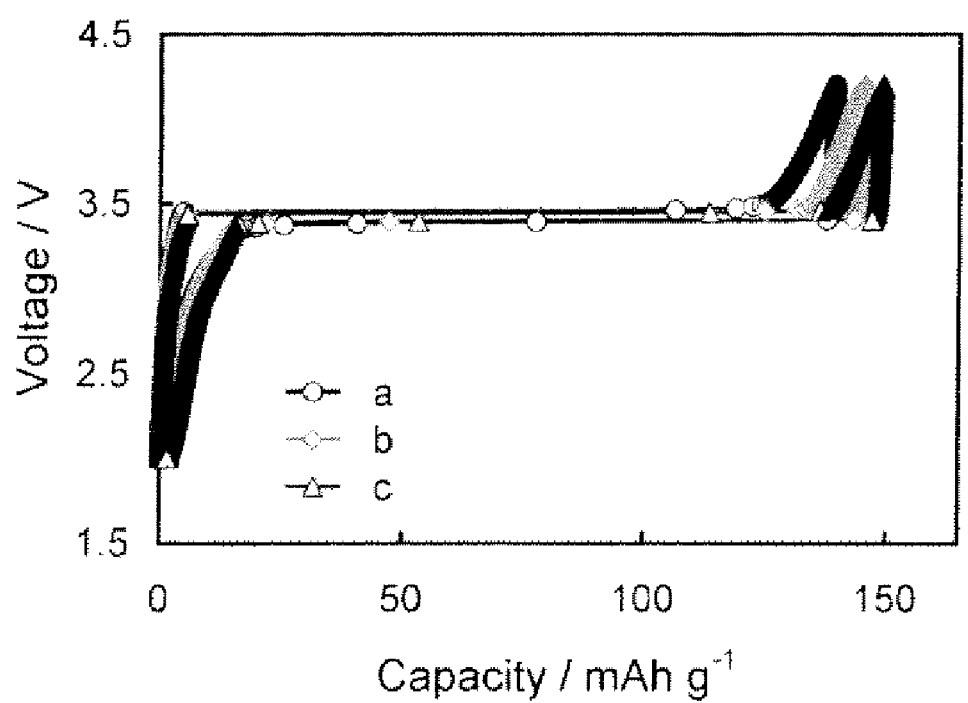

US 7,824,802 B2

METHOD OF PREPARING A COMPOSITE CATHODE ACTIVE MATERIAL FOR RECHARGEABLE ELECTROCHEMICAL CELL

BACKGROUND OF THE INVENTION

1. Field of the Invention

This invention relates to a cathode active material having superior cell characteristics in rechargeable electrochemical cells, more particularly to a carbon-containing composite cathode having a general formula of $LiFe_{1-x}M_xPO_4$—C, within $0 \leq x < 1$, M is selected from the group consisting of Co, Ni, V, Cr, Mn and a mixture thereof.

2. Description of the Prior Art

Lithium-ton batteries have been a main power source for portable electronic devices, such as cellular phone, laptop, camera and camcorder because of their high energy, high power and long cycling life. These batteries currently use a lithiated transition metal oxide, such as $LiCoO_2$, $LiNi_{1-x}Co_xO_2$, or $LiMn_2O_4$, as the cathode active material. Such materials contain toxic transition metal and also are high cost; moreover, they are unsafe at the fully charged state. Therefore, extensive researches have recently been focused on searching for the alternative cathode active material that is safe and environmental benign.

U.S. Pat. Nos. 5,910,382, 6,391,493 and 6,514,640 proposed lithium iron phosphate ($LiFePO_4$) as a candidate for the cathode active material of rechargeable lithium and lithium-ion batteries. This material does not contain toxic heavy metal element and starting materials for its synthesis are low cost, compared with the current cathode materials of $LiCoO_2$, $LiNi_{1-x}Co_xO_2$, and $LiMn_2O_4$, while provides highly thermal stability. Furthermore, the $LiFePO_4$ has a theoretical capacity of 170 mAh/g and a flat discharge potential of 3.4 V versus $Li/Li^+$. These properties make it an attractive candidate for the cathode material of rechargeable batteries. However, $LiFePO_4$ has very low electronic conductivity, the cell using it suffers high electric polarization and poor rate capability. To overcome these problems, a carbon-coating method has been proposed to enhance the electronic conductivity of the $LiFePO_4$ cathode active material. Meanwhile, this method offers an additional advantage. That is, the carbon at high temperature becomes highly reductive, which consequently provides a reductive environment to protect Fe(II) in the $LiFePO_4$ cathode from being oxidized by oxygen in air.

U.S. Pat. No. 6,632,566 discloses that the preparation of $LiFePO_4$ should be conducted under an inert atmosphere having high purity such as $N_2$ and Ar, or under a reductive atmosphere such as a $H_2/N_2$ mixture and $NH_3$. Otherwise, Fe (II) in the product will be oxidized to Fe (III) by a trace amount of oxygen contained in the inert gas, which reduces capacity of the $LiFePO_4$. On the other hand, $LiFePO_4$ is an inherently poor electronic conductor. CA Patent 2,270,771 teaches that mixing a small amount of polymer into the starting materials can significantly enhance electronic conductivity of the $LiFePO_4$ as the polymer thermally discomposes to form an electronically conductive carbon that subsequently coats onto the surface of $LiFePO_4$.

Following CA Patent 2,270,771, Huang et al (Solid-State Lett. 4: A170-A172, 2001) heated a composite of the phosphate and a carbon xerogel formed from a resorcinol-formaldehyde precursor to prepare a $LiFePO_4$—C composite, in which the composite cathode achieved 90% theoretical capacity at C/2. However, the procedure of making the composite cathode is rather complicated and very costly, whereas the composite contains about 15% (by weight) of carbon, which reduces the overall specific capacity of the composite cathode since carbon itself does not participate in the cell reactions. To alleviate these concerns, Chen et al (J. Electrochem. Soc. 149: A1184-A1189, 2002) heated a mixture of the starting materials and inexpensive sugar to get a $LiFePO_4$—C composite having reduced particle size and small content of carbon, while providing comparable rate capability. However, the composite cathode such-made suffers a dramatic decrease in the tap density, which hence reduces volumetric energy density of the battery.

WO2004001881 discloses a solution method for preparing $LiFePO_4$—C composite cathode. This method includes dissolving the starting materials in a 1:1 (molar ratio) aqueous solution of polycarboxylic acid and polyhydric alcohol. After polyesterification of the acid and alcohol, the solution is evaporated and then heated in an inert atmosphere to produce the $LiFePO_4$—C composite. Because of the formation of a complex between metal cations and the resultant polymer, the resultant composites such-made are fine and their particle sizes are very uniform. This method is not efficient as additional care is required to prevent oxidization of the Fe(II) ions in the solution by air.

A common characteristic of the above processes is that the enhancement in the electronic conductivity of the $LiFePO_4$—C composite is based on the formation of carbon on the surface of the cathode active material through a thermal decomposition of the organic polymer or small compound, whereas the thermal decomposition is greatly affected by the heating temperature and time. Low temperature and insufficient heating time cannot produce highly conductive carbon, while high temperature and long heating time not only induce growth of the product particle size but also cause reduction of the $LiFePO_4$ by the resultant carbon. Therefore, electronic conductivity of carbon is limited by the trade-off between these two opposite effects.

On the other hand, Prosini et al (Electrochim. Acta, 46: 3517-3523, 2001) proposed an alternative method for the preparation of the $LiFePO_4$—C composite by mixing 10 wt. % of carbon black, instead of organic polymer and compound, into the starting materials and then heating the resultant mixture at 800° C. for 16 h. U.S. Pat. No. 7,025,907 issued Apr. 11, 2006 to Kohzaki et. al. also used the similar approach, that is adding elemental carbon in one form or another mixed into the starting materials as the source of conducting carbon, but with special care taken in the heating step to not convert the iron present from ferrous (valence II) to ferric (valence III). The shortcoming of these methods is obvious. First, the physical contact between carbon and $LiFePO_4$ particles is limited by the solid-state phase. Second, the content of carbon is high, which will induce reduction of the $LiFePO_4$ active material due to the strong reductive property of carbon at high temperature. To solve these problems, U.S. Pat. Nos. 6,797,431, 6,811,924 and 6,814,764 propose a high speed hall-milling method to increase the physical contact of carbon and $LiFePO_4$, while still employs as high as 10 wt. % of carbon black. This method adds a high-speed ball-milling step for from tens to over a hundred hours before the heating step. Such an approach is timely ineffective and cannot avoid the reduction of the $LiFePO_4$ due to the presence of significant excess carbon.

U.S. Pat. No. 7,060,206 teaches the use of a significantly high amount of elemental carbon as both the reducing agent and carbon source. In another aspect, it teaches that the reducing carbon can be provided by a mixture of elemental carbon and organic precursor material. The organic precursor taught in this reference is a family of carbohydrate compounds, such as sucrose, which are incapable of complexing the transition metal ions and ineffective in reducing the particle size of the final products. Furthermore, the presence of the significantly high amount of carbon may reduce the product into the inactive $Fe_2P$.

U.S. Pat. Nos. 6,720,112, 6,730,281 and 6,884,544 teach a carbothermal reduction method for the preparation of the $LiFePO_4$—C composite active material, in which much excess amount of carbon is mixed with the mixture of lithium phosphate and iron (III) oxide in a stoichiometric molar ratio. The $LiFePO_4$ cathode active material is formed through the thermal reduction of Fe(III) oxide by carbon. Because of the presence of significant excess amount of carbon, it is possible for the $LiFePO_4$ to be reduced to $FeP_2$, which consequently reduces the electrochemical characteristics of the composite cathode.

SUMMARY OF THE INVENTION

Accordingly, an object of this invention is to provide a method of preparing a cathode active material having superior cell characteristics through synthesis of a carbon composite represented by the general formula of $LiFe_{1-x}M_xPO_4$—C, wherein $0 \leq x < 1$, M is selected from the group consisting of Co, Ni, V, Cr, Mn and a mixture thereof Another object of the present invention is to provide a cost efficient method for the preparation of the said cathode.

These and additional objects of the invention are accomplished by two calcinations steps at different temperatures and the use of both elemental carbon and an organic complexing agent as the carbon sources.

BRIEF DESCRIPTION OF THE DRAWINGS

A snore complete appreciation of the invention will be readily obtained by reference to the following Description of the Preferred Embodiments and the accompanying drawings in which like numerals in different figures represent the same structures or elements. The representations in each of the figures are diagrammatic and no attempt is made to indicate actual scales or precise ratios. Proportional relationships are shown as approximates.

FIG. 3 is a graph showing X-ray pattern of the $LiFePO_4$—C composites.

FIG. 4 is a graph comparing voltage profile of the charge and discharge cycle of the $Li/LiFePO_4$—C cells.

DESCRIPTION OF THE PREFERRED EMBODIMENTS

Figure 1:
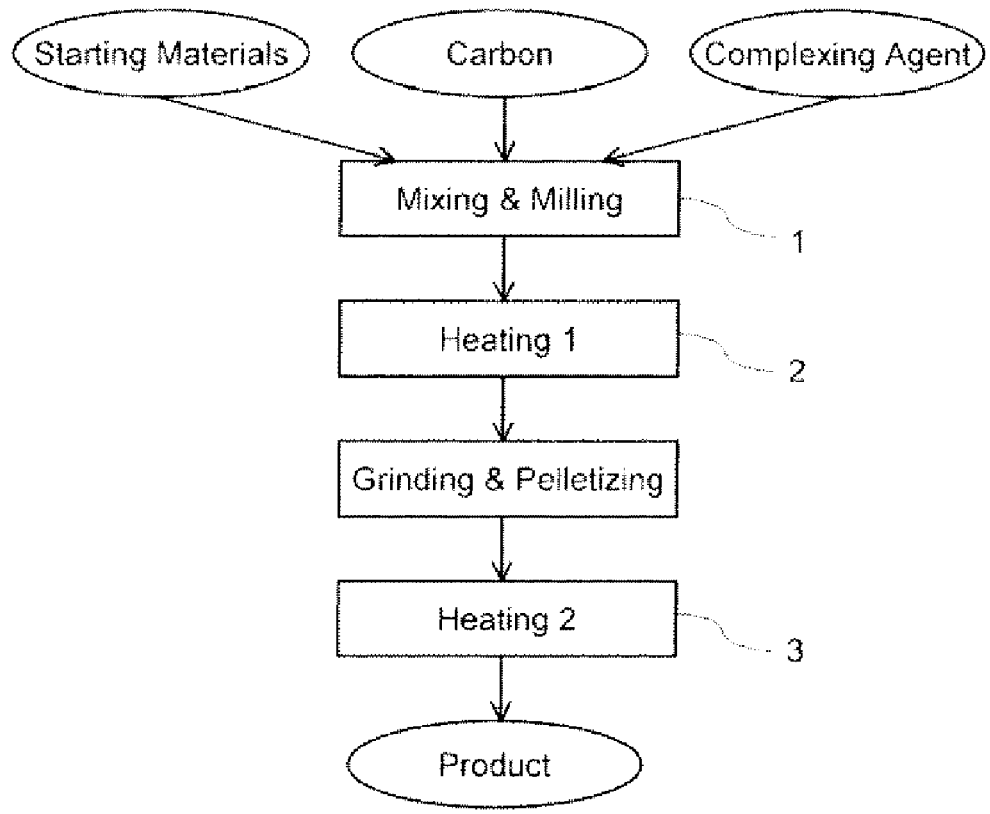
FIG. 1 is a flowchart depicting the steps of an embodiment of the present invention.

It has been found that the above objects are achieved by a process shown in FIG. 1, which includes the steps of mixing and milling starting materials bearing Li, Fe, M, and P atoms in a stoichiometric molar ratio with carbon and an organic complexing agent (1), heating the resultant mixture at a first temperature to form a composite precusor (2), and grinding and heating the precursor at a second temperature to produce composite cathode active material (3). To prevent Fe(II) in the staring material and $LiFePO_4$ from being oxidized by oxygen in air, heating steps (2) and (3) require an inert reacting environment, usually under a flow of nitrogen or argon gas.

In step (1), starting material for lithium source is selected from the group consisting of LiOH, $Li_2CO_3$, $CH_3COOLi$, $LiNO_3$, $Li_2C_2O_4$, $LiHC_2O_4$, $Li_3PO_4$, $Li_2HPO_4$, $LiH_2PO_4$ and a mixture thereof. Starting material for iron source is selected from the group consisting of FeO, $FeCO_3$, $Fe(CH_3CO_2)_2$, $Fe(NO_3)_3$, $FeC_2O_4$, $Fe_3(PO_4)_2$, $FePO_4$ and a mixture thereof. Starting material for M source is an oxide or a salt having the similar anion as Li and Fe sources. Starting material for phosphate anion source is selected from the group consisting of $H_3PO_4$, $Li_3PO_4$, $Li_2HPO_4$, $LiH_2PO_4$, $(NH_4)_3PO_4$, $(NH_4)_2HPO_4$, $NH_4H_2PO_4$, $Fe_3(PO_4)_2$, $FePO_4$ and a mixture thereof.

Carbon in step (1) is preferably selected from those having high electronic conductivity and small particles, including amorphous and graphitized carbons, or mixture thereof. The content of carbon in the overall mixture is in a range from 1 to 10% versus the theoretical weight of the cathode active material, which is calculated from the weight of staring materials.

Complexing agent in step (1) is an organic polycarboxylic acid, which serves two functions of forming a complex with the metal cations in the starting materials and providing a source of carbon. Preferably, polycarboxylic acid is selected from the group consisting of oxalic acid, malonic acid, succinic acid, glutaric acid, adipic acid, phthalic acid, iso-phthalic acid, tere-phthalic acid, malic acid, tartaric acid, citric acid, fumaric acid, maleic acid, and mixtures thereof. More preferably, the polycarboxylic acid contains one or more hydroxyl groups, such as malic acid, tartaric acid and citric acid. Molar ratio of the complexing, agent to Li in the mixture is in a range from 0.01 to 2.0, preferably from 0.1-1.0.

In step (1), a ball-miller or a high speed/shear miller is used for mixing and milling. Because of the pre-added carbon serving as a solid lubricant, the milling process is facilitated and milling efficiency is high. Therefore, milling time in the present invention is greatly shortened.

Preparation of the composite precursor (2) is conducted at a temperature ranging from 250° C. to 450° C., preferably from 350° C. to 420° C. for a time period of from 1 to 20 hours, preferably from 4 to 6 hours. At such temperatures, polycarboxylic acid melts and loses small molecules, such as $H_2O$ and $CO_2$, to form precursor of carbon. During this process, the source materials are wetted by the molten acid and their complexes with acid are formed. Subsequent decomposition of the polycarboxylic acid and resultant complex produces a conductive carbon, which electronically bridges the particles of the cathode material and the pre-added carbon or thereof.

Formation of the composite cathode active material (3) is conducted at a temperature ranging from 500° C. to 950° C., preferably from 780° C. to 820° C. for a heating time period of from 1 to 20 hours, preferably from 4 to 6 hours. Before step (3), the resulting precursor is re-ground and pressed into small pellets to increase reaction efficiency.

Figure 2:
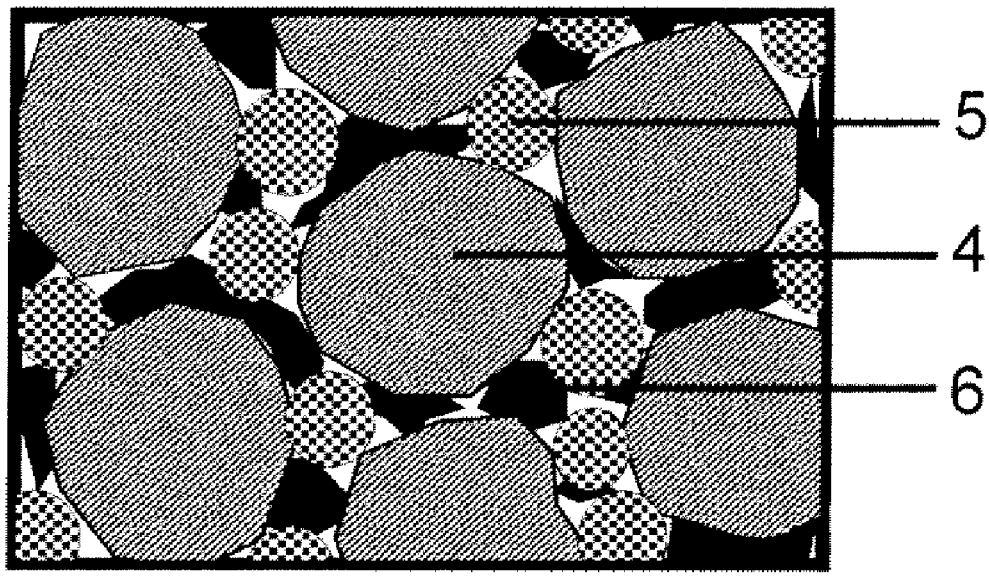
FIG. 2 is a graph depicting the structure of the composite cathode active material.

In addition to the particles being fine and uniform, the composite cathode material prepared by the present invention has enhanced electronic conductivity, as interpreted in FIG. 2. First, the pre-added carbon (5) having high electronic conductivity uniformly distributes around the cathode particles (4), which makes an electronic connection between the particles of the cathode material. Second, the carbon (6) formed by thermal decomposition of the polycarboxylic acid and complex makes an additional contribution to the electronic conductivity by entering the spaces that otherwise cannot be filled by the pre-added carbon. Third, the presence of carbon and complexing agent during reactions suppresses aggregation of the cathode particles, which favors the formation of fine and uniform product.

Another advantage of the present invention is that steps (2) and (3) are more cost efficient because they do not require a highly pure inert atmosphere. In step (2), the small molecules released during the thermal decomposition of polycarboxylic acid and its related complex are highly reductive, which helps to protect Fe(II) from being oxidized. In step (3), carbon at high temperature becomes very reductive, which provides a strongly reductive environment. Further advantage of the present invention is that it greatly shortens reaction time for both of steps (2) and (3).

Having described the invention, the following examples are given to illustrate specific applications of the invention including the best mode now known to perform the invention. These specific examples are not intended to limit the scope of the invention described in this application.

EXAMPLES

Three $LiFePO_4$—C composites were prepared by using the formulation listed in Table 1, in which Li, Fe, and P were in a molar ratio of 1:1:1. Samples A and B were prepared for the purpose of comparison, where Sample A did not use citric acid whereas Sample B did not use carbon.

TABLE 1

Feeding formulation of the starting materials for the preparation

| | | Sample # | | |
|---|---|---|---|---|
| | | A | B | C |
| $LiH_2PO_4$ | 99%, Aldrich | 10.39 g | 10.39 g | 10.39 g |
| $FeC_2O_4 \cdot 2H_2O$ | 99.999%, Alfa | 17.99 g | 17.99 g | 17.99 g |
| Carbon* | Cabot | 0.82 g | 0 g | 0.49 g |
| Citric acid | 99.5%, Aldrich | 0 g | 19.21 g | 19.21 g |
| Feed ratio** | | C = 5% | Li/acid = 1:1 | C = 3% Li/acid = 1:1 |

*Carbon is Black Pearls ® 2000.
**Carbon content is a weight percentage versus the theoretical weight of $LiFePO_4$, and Li/acid ratio is a molar ratio.

All starting materials were mixed and ball-milled for 3 hours, and then the mixture was transferred to a tubular furnace. Under a flow of nitrogen to protect Fe(II) from being oxidized by oxygen in air, the mixture was heated at a rate of 10° C./min to 380° C. and then remained at 380° C. for 5 hours. During the process of temperature rising, citric acid was molten and complexing reactions between the metal cations and polycarboxylic acid occurred. The subsequent thermal decomposition resulted in the formation of a $LiFePO_4$—C precursor. The resulting precursor was ground and pelletized, followed by transferring the pellet into the tubular furnace. Under the same nitrogen flow, the pellet was heated at 800° C. for 5 hours and then cooled down to room temperature. The pellet was ground to get a black $LiFePO_4$—C composite powder. Structural characterization by X-ray diffraction indicates that all these three composites have the same olivine crystallographic structure (FIG. 3).

For electrochemical examination, the above three $LiFePO_4$—C composites were coated onto an aluminum foil, respectively, by using acetylene black as the conducting agent, poly(acrylonitrile-co-methyl methacrylate) as the binder and N-methylpyrrolidone as the solvent. The electrode sheet having a loading of 10±1 mg/cm² was composed of 80 wt. % composite cathode, 15 wt. % acetylene black, and 5 wt. % binder. The resultant electrode was cut into small discs with an area of 1.27 cm² and dried at 120° C. for 8 hours under vacuum. A non-aqueous solution prepared by dissolving 0.8 M lithium bis(oxalato)borate) (LiBOB) in a 1:1:3 (wt.) mixture of propylene carbonate, ethylene carbonate and ethylmethyl carbonate was used as the electrolyte.

In an Ar-filled glove-box, $Li/LiFePO_4$—C coin cells were assembled using Celgard® 2500 membrane as the separator and filled with 80 μL of electrolytic solution. The cells were named as "a", "b", and "c" in response to the composites A, B, and C, respectively. FIG. 4 shows voltage profile of cells a, b, and c, which were recorded by cycling at 0.2 C between 2.0 V and 4.2 V. It is indicated that these three cells have a 140-150 mAh/g of discharge capacity and have a very flat potential plateaus. The plateau is estimated to be at 3.47 V and 3.39 V for charging and discharge, respectively. There is only 80 mV difference in the plateau voltage between charge and discharge processes, which suggests an excellent cycling reversibility of the $LiFePO_4$ cathode material.

Figure 5:
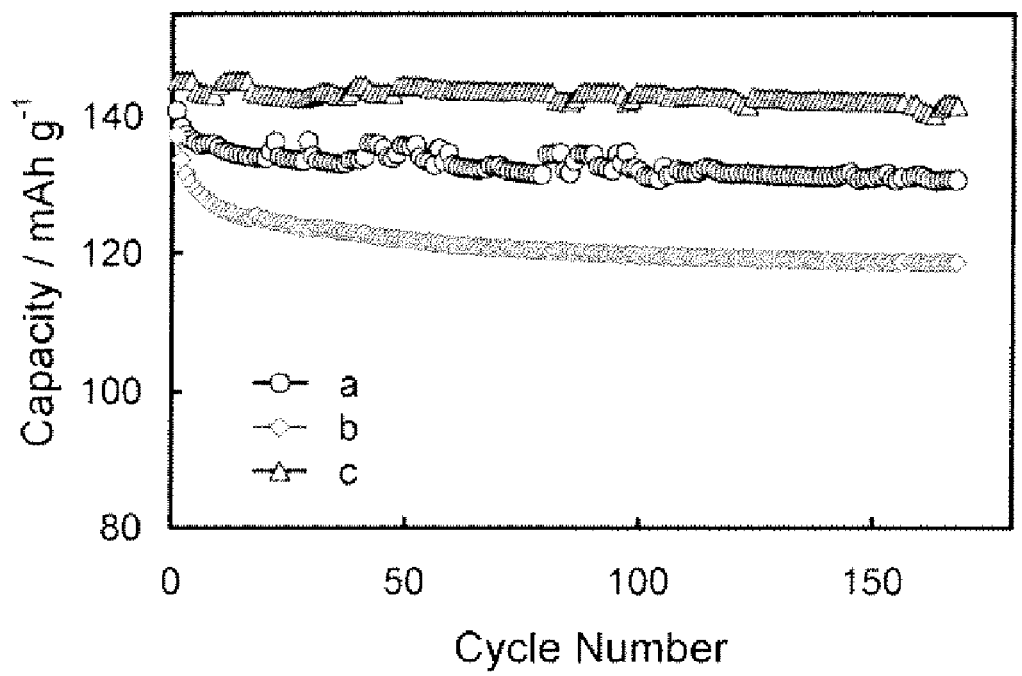
FIG. 5 is a graph comparing discharge capacity at room temperature of the $Li/LiFePO_4$—C cells.

FIG. 5 shows discharge capacities at room temperature of cells a, b and c, which were recorded by cycling at 0.5 C between 2.0 V and 4.2 V. It is indicated that all three cells started with about 150 mAh/g capacity, however, the capacity of cells a and b was faded much faster than that of cell c, showing that the $Li/LiFePO_4$—C composite prepared in the presence of the pre-added carbon and complexing agent has better capacity retention against the repeated cycling. After test as shown in FIG. 5, the cells were cycled by charging at 0.5 C and discharging at different current rates. Each rate was repeated 5 times, and the average discharge capacities were plotted in FIG. 6, which shows that cell c has the highest rate capability. This merit is attributed to the higher electronic conductivity and smaller particle size of composite c.

Figure 6:
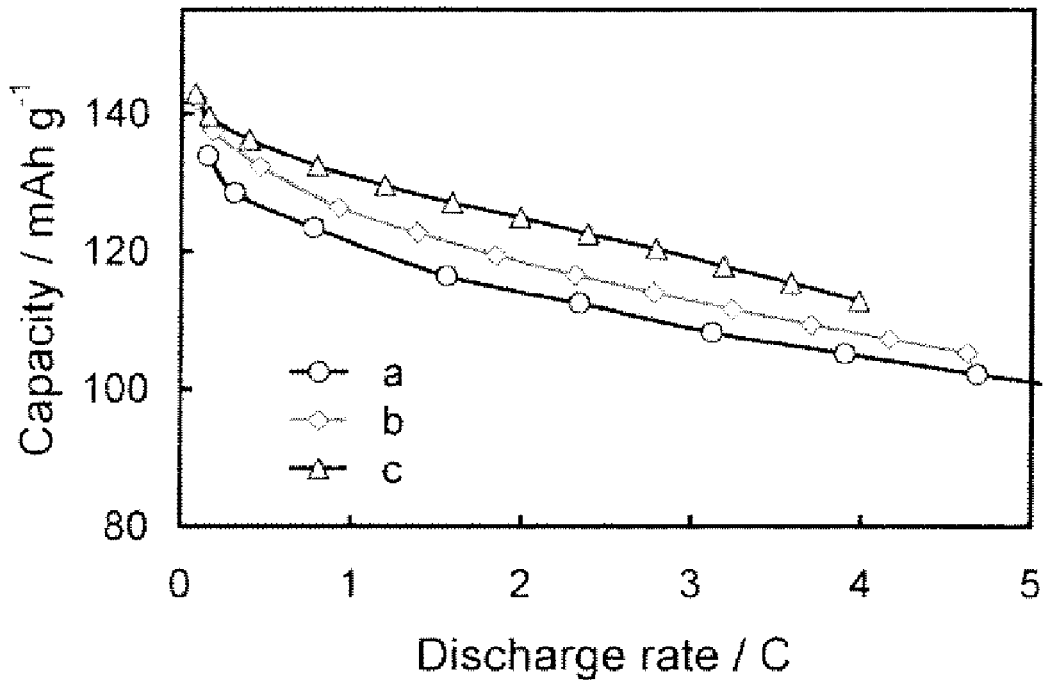
FIG. 6 is a graph comparing discharge capacity at various current rates of the $Li/LiFePO_4$—C cells.
Figure 7:
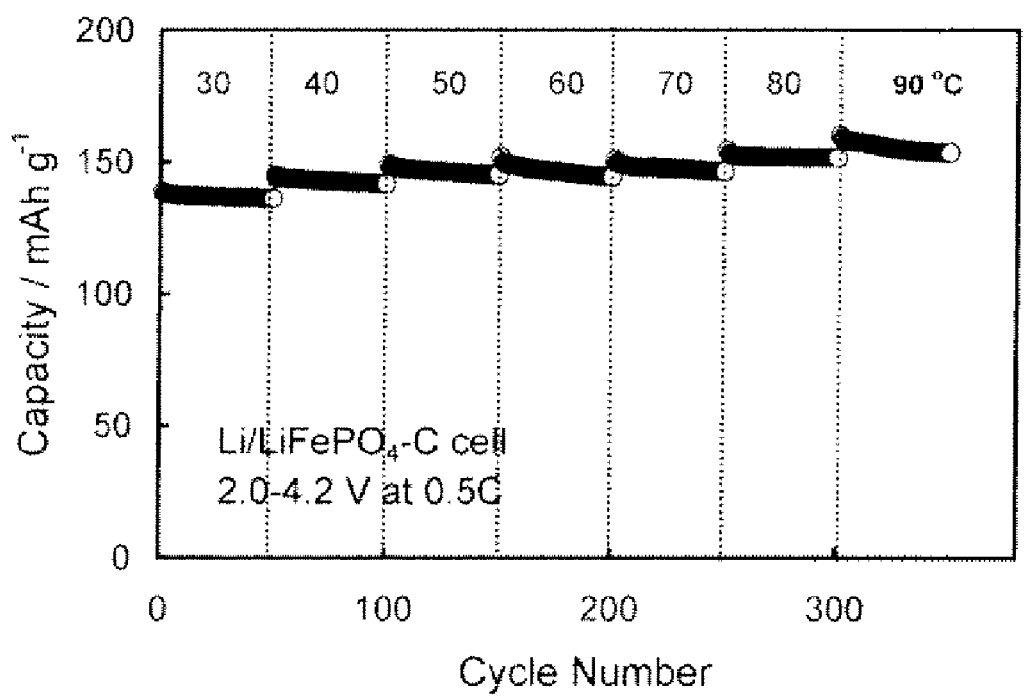
FIG. 7 is a graph showing discharge capacity at various temperatures of the $Li/LiFePO_4$—C cell.

After tests as described in FIG. 5 and FIG. 6, cell c was continuously cycled at 0.5 C at different temperatures. Discharge capacities of the composite cathode at various temperatures are plotted against cycle number in FIG. 7, which shows that even at 90° C. the cell can be cycled well with very slow capacity fading. This result verifies excellent thermally stability of the $LiFePO_4$—C composite cathode and LiBOB-based non-aqueous electrolyte. Meanwhile, FIG. 7 shows that at 90° C. the initial capacity or the composite cathode achieved to 158 mAh/g, that equals 93% of the theoretical capacity of the pure $LiFePO_4$ cathode material. This result indirectly suggests that the total content of the electrochemically inert carbon in the $LiFePO_4$—C composite cathode is low.

Obviously many modifications and variations of the present invention are possible in light of the above teachings. It is therefore to be understood that, within the scope of the appended claims the invention many be practiced otherwise than as specifically described.

What is claimed is:

1. A method of preparing a composite cathode material consisting of the steps of:
  (a) Mixing and milling together the starting materials carbon and an organic acid complexing agent with not more than the weight percentage of carbon being in the range from 1 to 10% versus the theoretical weight of the cathode active material which is calculated from the weight of staring materials under non-aqueous condition conditions to form a mixture;
  (b) Heating the mixture at a first temperature of from 250° C. to 450° C. under an inert atmosphere to form a composite precursor;
  (c) Grinding and pelletizing the resulting composite precursor to form a pellet; and (d) Re-heating said pellet at a second temperature of from 500° C. to 950° C. under an inert atmosphere to form the composite cathode;

wherein the composite cathode material has a general formula of $LiFe_{1-x}M_xPO_4$—C, with $0<x<1$ and M is selected from the group consisting of Co, Ni, V, Cr, Mn and a mixture thereof.

2. The method according to claim 1 wherein the starting material is a mixture of two or more compounds bearing Li, Fe, M and phosphate in a stoichiometric molar ratio.

3. The method according to claim 1 wherein the complexing agent is an organic polycarboxylic acid selected from the group consisting of oxalic acid, malonic acid, succinic acid, glutaric acid, adipic, phthalic acid, iso-phthalic acid, terephthalic acid, malic acid, tartaric acid, citric acid, fumaric acid, maleic acid, and mixtures thereof.

4. The method according to claim 3 wherein the polycarboxylic acid contains one or more hydroxyl groups.

5. The method according to claim 3 wherein the molar ratio of the complexing agent to Li is in a range from 0.01 to 2.0.

6. The method according to claim 5 wherein the molar ratio of the complexing agent to Li is in the range of from 0.1 to 1.0.

7. The method according to claim 1 wherein the first temperature is in a range from 250° C. to 450° C., and heating time is in a range from 1 to 20 hours.

8. The method according to claim 7 wherein the first temperature is in the range of 350° C. to 420° C. and the heating time is in the range of 4 to 6 hours.

9. The method according to claim 1 wherein the second temperature is in a range from 500° C. to 950° C. and heating time is in a range from 1 to 20 hours.

10. The method according to claim 9 wherein the second temperature is in a range of 780° C. to 820° C., and heating time is in a range of 4 to 6 hours.

11. The method according to claim 1 wherein the inert atmosphere is selected from the group consisting of a flow of nitrogen or argon gas.

12. A non-aqueous electrochemical cell consisting of an anode, a non-aqueous electrolyte and a cathode prepared by the method of claim 1.

13. The method according to claim 4 wherein the polycarboxylic acid is selected from the group consisting of malic acid, tartaric acid and citric acid.

14. The method according to claim 1 wherein the composite cathode material has a general formula of $LiFe_{1-x}M_xPO_4$—C, where x=0 and M is selected from the group consisting of Co, Ni, V, Cr, Mn and a mixture thereof.

* * * * *